United States Patent
Chavannavar

(10) Patent No.: US 9,109,486 B2
(45) Date of Patent: Aug. 18, 2015

(54) SYSTEM AND METHOD FOR REDUCTANT INJECTION

(71) Applicant: Caterpillar Inc., Peoria, IL (US)

(72) Inventor: Praveen S. Chavannavar, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 30 days.

(21) Appl. No.: 14/031,323

(22) Filed: Sep. 19, 2013

(65) Prior Publication Data

US 2015/0075134 A1    Mar. 19, 2015

(51) Int. Cl.
*F01N 3/00* (2006.01)
*F01N 3/05* (2006.01)

(52) U.S. Cl.
CPC .......................................... *F01N 3/05* (2013.01)

(58) Field of Classification Search
USPC .................... 60/286, 295, 296, 297, 301, 303
See application file for complete search history.

(56) References Cited

U.S. PATENT DOCUMENTS

| | | | |
|---|---|---|---|
| 4,337,032 A | 6/1982 | Duplouy et al. | |
| 4,571,938 A * | 2/1986 | Sakurai | 60/303 |
| 7,980,069 B2 * | 7/2011 | Arellano et al. | 60/297 |
| 8,015,802 B2 * | 9/2011 | Nishiyama et al. | 60/286 |
| 8,250,859 B2 * | 8/2012 | Torisaka et al. | 60/295 |
| 8,459,017 B2 * | 6/2013 | Paterson et al. | 60/324 |
| 8,726,640 B2 * | 5/2014 | Tilinski et al. | 60/286 |
| 2011/0308234 A1 | 12/2011 | De Rudder et al. | |

FOREIGN PATENT DOCUMENTS

| | | |
|---|---|---|
| DE | 102005028139 | 12/2006 |
| FR | 2891305 | 3/2007 |
| WO | 2011110885 | 9/2011 |

* cited by examiner

Primary Examiner — Binh Q Tran

(57) ABSTRACT

A mixing chamber for an exhaust system is disclosed. The mixing chamber includes a tapering cross sectional area perpendicular to a longitudinal axis of the mixing chamber. The mixing chamber includes a first end having a first cross sectional area and a second end having a second cross sectional area. The second cross sectional area is less than the first cross sectional area. The second end is configured to receive an injector. The mixing chamber includes a first exhaust conduit fluidly connected to the first end of the mixing chamber and defining a first exhaust gas flow path into the mixing chamber substantially perpendicular to the longitudinal axis. The mixing chamber also includes a second exhaust conduit fluidly connected to the first end of the mixing chamber and defining a second exhaust gas flow path out of the mixing chamber substantially in the direction of the longitudinal axis.

16 Claims, 4 Drawing Sheets

SYSTEM AND METHOD FOR REDUCTANT INJECTION

TECHNICAL FIELD

The present disclosure relates to a system and method for reductant injection, and more specifically to a mixing chamber for reductant injection.

BACKGROUND

Mixers are used in engine aftertreatment systems for mixing of two or more fluids. The fluids may include an exhaust gas of an engine and a reductant for treating or reducing one or more constituents of the exhaust gas. A mixer may provide a swirl effect, turbulence or any other mixing effect to provide a uniform mixing of fluids. During the mixing, the fluid such as the reductant may contact and form deposits on the surface of the mixer. After prolonged use, the reductant deposits may block channels and/or passages provided in the mixer. This blockage of the passages may affect the efficiency of the mixer.

U.S. Published Application Number 2011/0308234 discloses a dosing and mixing arrangement. The arrangement includes a mixing tube having a constant diameter along its length. At least a first portion of the mixing tube includes a plurality of apertures. The arrangement also includes a swirl structure for causing exhaust flow to swirl outside of the first portion of the mixing tube in one direction along a flow path that extends at least 270 degrees around a central axis of the mixing tube. The arrangement is configured such that the exhaust enters an interior of the mixing tube through the apertures as the exhaust swirls along the flow path. The exhaust entering the interior of the mixing tube through the apertures has a tangential component that causes the exhaust to swirl around the central axis within the interior of the mixing tube. The arrangement also includes a doser for dispensing a reactant into the interior of the mixing tube.

SUMMARY OF THE DISCLOSURE

In one aspect, a mixing chamber for an exhaust system is disclosed. The mixing chamber includes a tapering cross sectional area perpendicular to a longitudinal axis of the mixing chamber. The mixing chamber includes a first end having a first cross sectional area and a second end having a second cross sectional area such that the second cross sectional area is less than the first cross sectional area. The second end is configured to receive an injector. The mixing chamber also includes a first exhaust conduit fluidly connected to the first end of the mixing chamber and defining a first exhaust gas flow path into the mixing chamber substantially perpendicular to the longitudinal axis. The mixing chamber further includes a second exhaust conduit fluidly connected to the first end of the mixing chamber and defining a second exhaust gas flow path out of the mixing chamber substantially in the direction of the longitudinal axis.

In another aspect, a method for mixing a fluid with exhaust gas is disclosed. The method includes flowing the exhaust gas into a mixing chamber in a first direction such that the first direction is substantially perpendicular to a longitudinal axis defined by the mixing chamber. The method includes flowing the exhaust gas in a second direction in a spiral pattern around the longitudinal axis such that the spiral pattern has a progressively decreasing diameter and the second direction is substantially the same as the longitudinal axis. The method includes injecting the fluid into the exhaust gas. The method also includes flowing the exhaust gas in a third direction such that the third direction is opposite the second direction. The method further includes flowing the exhaust gas out of the mixing chamber.

In yet another aspect, an exhaust system for an engine is provided. The exhaust system includes a mixing chamber defining a longitudinal axis. The mixing chamber includes a tapering cross sectional area perpendicular to the longitudinal axis. The mixing chamber includes a first end having a first cross sectional area and a second end having a second cross sectional area such that the second cross sectional area is less than the first cross sectional area. The mixing chamber includes a first exhaust conduit fluidly connecting an exhaust manifold of the engine to the first end of the mixing chamber and defining a first exhaust gas flow path into the mixing chamber substantially perpendicular to the longitudinal axis. The mixing chamber also includes a second exhaust conduit fluidly connecting the first end of the mixing chamber to a Selective Catalytic Reduction (SCR) catalyst and defining a second exhaust gas flow path out of the mixing chamber substantially in the direction of the longitudinal axis. The mixing chamber further includes an injector configured to inject urea into the second end of the mixing chamber.

DETAILED DESCRIPTION

Reference will now be made in detail to specific embodiments or features, examples of which are illustrated in the accompanying drawings. Generally, corresponding or similar reference numbers will be used, when possible, to refer to the same or corresponding parts.

Figure 1:
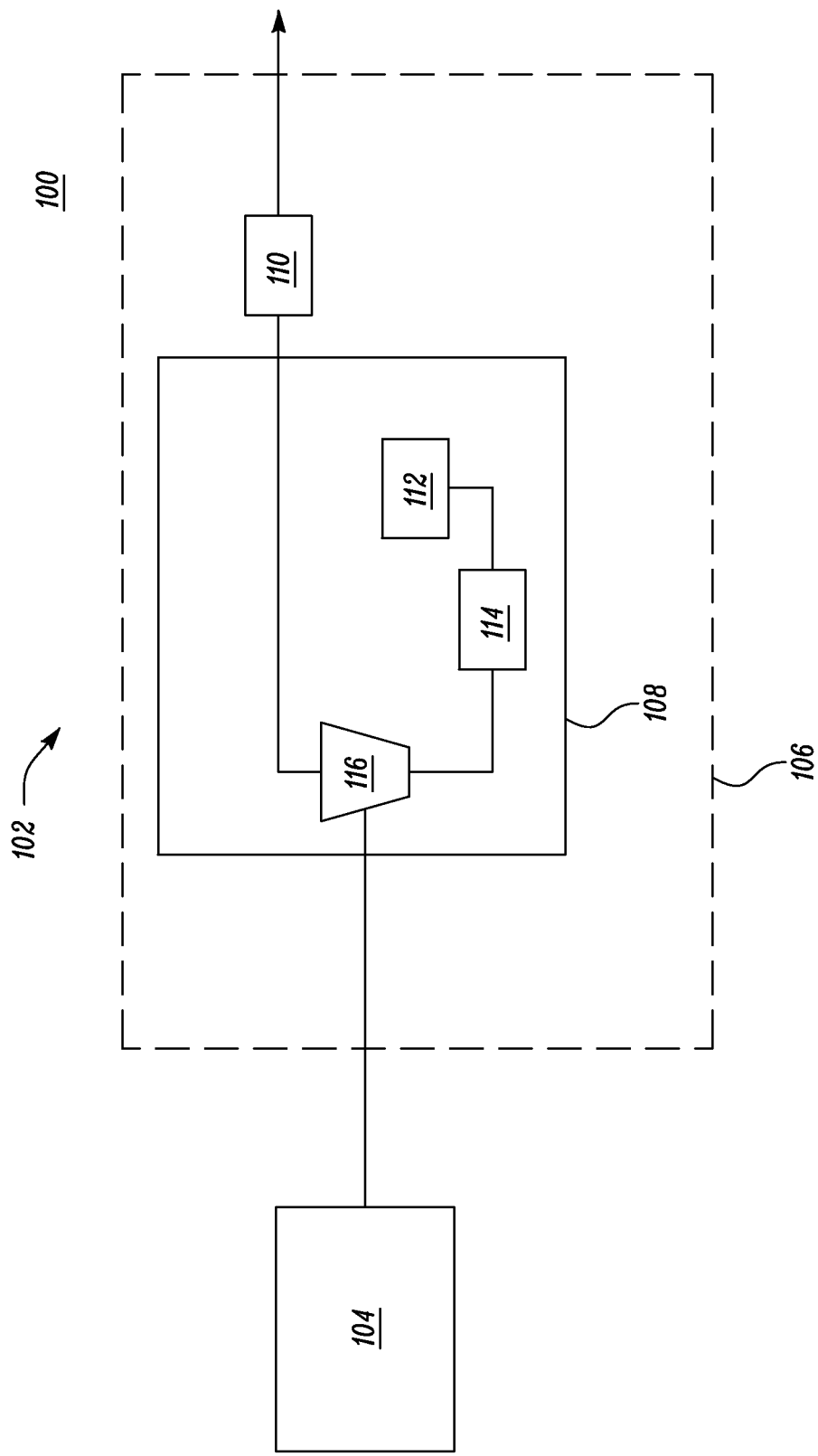
FIG. 1 is an exemplary block diagram of an engine system according to one embodiment of the present disclosure.

Referring to FIG. 1, a block diagram 100 of an exemplary engine system 102 is illustrated. The engine system 102 includes an engine 104. In one embodiment, the engine 104 includes a diesel powered engine. In other embodiments, the engine 104 may include any internal combustion engine known in the art including, but not limited to, a gasoline powered engine, a natural gas powered engine or a combination thereof. The engine 104 may include other components (not shown) such as a fuel system, an intake system, a drivetrain including a transmission system and so on. The engine 104 may be used to provide power to any machine including, but not limited to, an on-highway truck, an off-highway truck, an earth moving machine and so on. Further, the engine system 102 may be associated with any industries including, but not limited to, transportation, construction, agriculture, forestry and material handling.

The engine system 102 includes an exhaust aftertreatment system 106 fluidly connected to an exhaust manifold (not shown) of the engine 104. The aftertreatment system 106 is configured to treat an exhaust gas flow exiting the exhaust manifold of the engine 104. The exhaust gas flow contains emission compounds that may include Nitrogen Oxides (NOx), unburned hydrocarbons, particulate matter and/or other compounds. The aftertreatment system 106 is configured to treat and reduce NOx, unburned hydrocarbons, particulate matter and/or other compounds of the emissions prior to the exhaust gas flow exiting the engine system 102.

The aftertreatment system 106 may include a reductant delivery module 108. The reductant delivery module 108 is configured for injecting a reductant in the exhaust gas flow. The aftertreatment system 106 may also include a Selective Catalytic Reduction (SCR) module 110 provided downstream of the reductant delivery module 108. The SCR module 110 is configured for reducing a concentration of NOx present in the exhaust gas flow. The SCR module 110 may include a catalyst for facilitating the reaction, reduction, or removal of NOx from the exhaust gas flow as the flow passes through the SCR module 110. The SCR module 110 may have a honeycomb or other structure made from or coated with an appropriate material. The material may be an oxide, such as vanadium oxide or tungsten oxide, coated on an appropriate substrate, such as titanium dioxide.

In one embodiment, the aftertreatment system 106 may include a filter (not shown), generally a Diesel Particulate Filter (DPF), provided upstream of the SCR module 110. The DPF may be coated with a suitable catalyst to promote oxidation of any particulate matter in the exhaust gas flow that may be trapped in the DPF.

Additionally, in another embodiment, the aftertreatment system 106 may further include a Diesel Oxidation Catalyst (DOC). In such an exemplary embodiment, the DOC may be followed downstream by the SCR module 110. Alternatively, the aftertreatment system 106 may omit the DPF and include only the SCR module 110. In yet another exemplary embodiment, a combined DPF/SCR catalyst (not shown) may be used.

Further, the aftertreatment system 106 may include one or more NOx sensors (not shown). The NOx sensors may be located at varying locations within the aftertreatment system 106. For example, the NOx sensors may be located upstream or downstream of the SCR module 110. The NOx sensors may be configured to measure the concentration of NOx compounds in the exhaust gas flow passing through the aftertreatment system 106. Similarly, other additional sensors such as a pressure sensor and a temperature sensor may also be included without any limitation.

The aftertreatment system 106 disclosed herein is exemplary. A person of ordinary skill in the art will appreciate that the aftertreatment system 106 may be disposed in various orders and/or combinations relative to the exhaust manifold. The aforementioned variations in position and the components included in the aftertreatment system 106 are possible without deviating from the scope of the disclosure and various other configurations not disclosed herein are also possible within the scope of this disclosure.

As shown in FIG. 1, the reductant delivery module 108 may include a storage tank 112, a pump 114 and a mixing chamber 116 for supplying the reductant in the exhaust gas flow of the aftertreatment system 106. The storage tank 112 selectively fluidly connects to the mixing chamber 116 through the pump 114 and an injector 210 (shown in relation to FIGS. 2 and 3) to provide a supply of the reductant to the mixing chamber 116. The reductant may be a fluid such as a Diesel Exhaust Fluid (DEF), comprising urea. Alternatively, the reductant may include ammonia or any other reducing agent. Parameters related to the storage tank 112 such as size, shape, location, and material used may vary as function system design and requirements.

The pump 114 is configured to pressurize and selectively deliver the reductant from the storage tank 112 to the mixing chamber 116 through the injector 210. The pump 114 may be any pump known in the art including, but not limited to, a piston pump, a centrifugal pump and so on. The mixing chamber 116 is fluidly connected to the exhaust manifold, and the SCR module 110. The mixing chamber 116 is configured for mixing of the exhaust gas flow received from the exhaust manifold and the reductant received from the storage tank 112 upstream of the SCR module 110.

Figure 2:
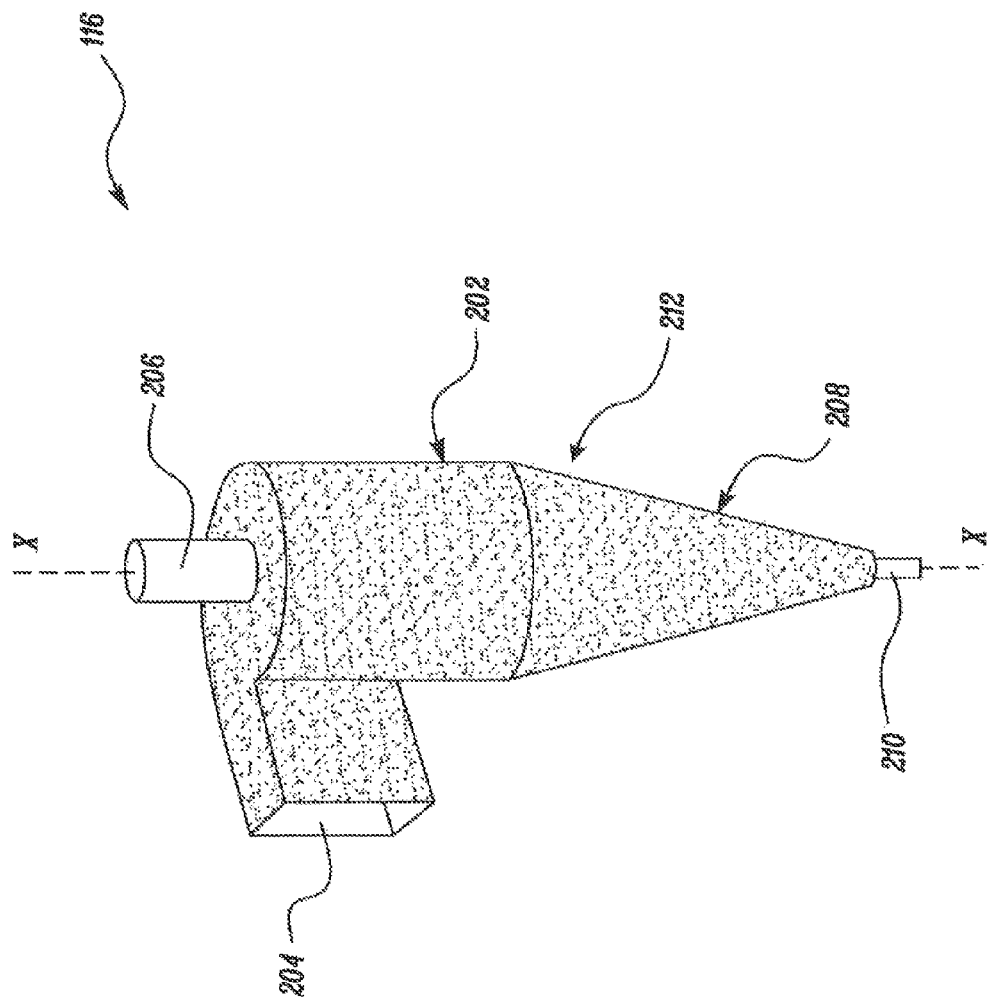
FIG. 2 illustrates a perspective view of an exemplary mixing chamber.

Referring to FIG. 2, a perspective view of the mixing chamber 116 is illustrated. The mixing chamber 116 is configured to provide the mixing of the reductant, such as urea, while preventing formation of reductant deposits on inner surfaces of the mixing chamber 116. The mixing chamber 116 includes a substantially hollow conical configuration having a longitudinal axis X-X. In the embodiment illustrated, the mixing chamber 116 includes a tapering cross sectional area 212 perpendicular to the longitudinal axis X-X.

The mixing chamber 116 includes a first end 202 having a first cross sectional area. The first cross sectional area includes a substantially circular shape. A first exhaust conduit 204 fluidly connects the first end 202 to the exhaust manifold for receiving the exhaust gas flow. In the embodiment illustrated, the first exhaust conduit 204 is disposed perpendicular to the longitudinal axis X-X and tangential to the first end 202 of the mixing chamber 116. In the embodiment illustrated, the first exhaust conduit 204 includes a substantially rectangular cross section. In other embodiments, the cross section of the first exhaust conduit 204 may include an alternative shape such as circular, elliptical, or any other shape which would be known by an ordinary person skilled in the art and may be a function of system design and configuration. The first exhaust conduit 204 is configured to provide a first exhaust gas flow path into the first end 202 of the mixing chamber 116. The first exhaust gas flow path is substantially perpendicular to the longitudinal axis X-X.

A second exhaust conduit 206 fluidly connects the first end 202 to an inlet (not shown) of the SCR module 110. In one embodiment, the second exhaust conduit 206 is provided along the longitudinal axis X-X. In another embodiment, the second exhaust conduit 206 is provided parallel to and in a spaced apart arrangement with respect to the longitudinal axis X-X. The second exhaust conduit 206 is configured to provide a second exhaust gas flow path out of the mixing chamber 116 substantially in a direction of the longitudinal axis X-X.

The mixing chamber 116 includes a second end 208 longitudinally spaced apart from the first end 202. The second end 208 includes a second cross sectional area less than the first cross sectional area of the first end 202. The injector 210 may be positioned to inject the fluid into the second end 208. The injector 210 may be positioned to inject the fluid substantially in the direction of the longitudinal axis X-X. In the embodiment illustrated, the injector 210 includes an elongated body including a length substantially in the direction of the longitudinal axis X-X. In an alternative embodiment, the injector 210 may be disposed with the length parallel to and in a spaced apart arrangement with respect to the longitudinal axis X-X. In yet another embodiment, the injector 210 may be disposed angularly with respect to the longitudinal axis X-X. In the embodiment illustrated, the injector 210 is disposed in the second end 208 such that the second exhaust conduit 206 is positioned directly above the injector 210. The injector 210 is fluidly connected to the storage tank 112 through the pump 114. The injector 210 is configured to inject the reductant into the second end 208 of the mixing chamber 116.

Figure 3:
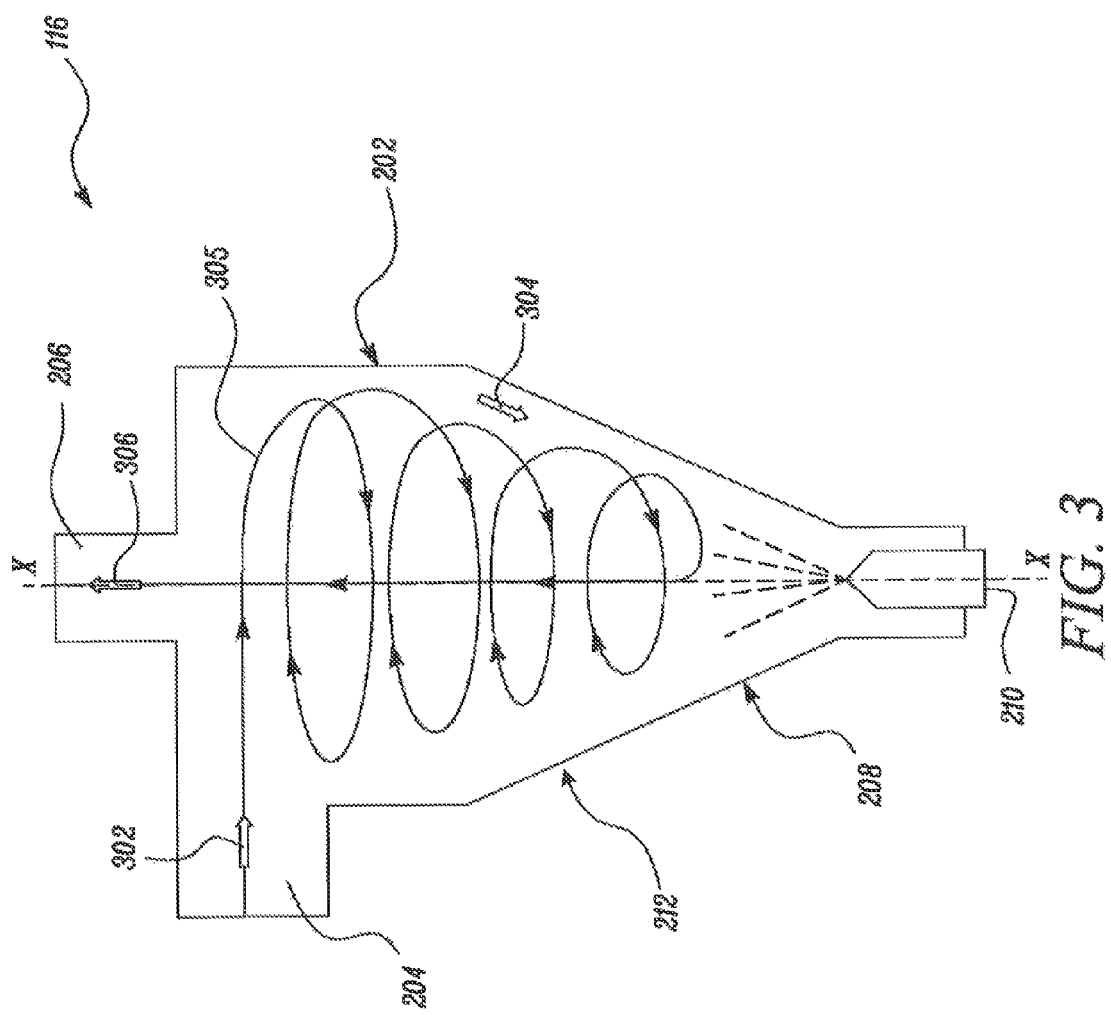
FIG. 3 illustrates a cross sectional view of the exemplary mixing chamber of FIG. 2.

Referring to FIG. 3, a cross sectional view of an exemplary mixing chamber 116 is illustrated. FIG. 3 illustrates directions of the exhaust gas flow within the mixing chamber 116. The exhaust gas flow is received through the first exhaust conduit 204 and may flow in a first direction as denoted by an arrow 302. At least partially due to the tangential location of the first exhaust conduit 204 to the first end 202 and the conical configuration of the mixing chamber 116, the exhaust gas may flow in a second direction towards the second end 208 as denoted by an arrow 304. The exhaust gas may flow in a spiral pattern 305 around the longitudinal axis X-X while flowing in the second direction. The spiral pattern 305 has a progressively decreasing diameter towards the second end 208 corresponding to the conical configuration of the mixing chamber 116.

At the second end 208, the direction of the exhaust gas changes from the second direction to a third direction. The third direction is denoted by an arrow 306 and may be at least partially opposite to the second direction. The exhaust gas flow may make a close to 180° turn at the second end 208 to change from the second direction to the third direction.

The reductant may be injected by the injector 210 at the second end 208. The injector 210 may inject the reductant into the mixing chamber 116 in the form of an intermittent or a continuous spray, stream or jet. As the engine 104 is running, the exhaust gas flows continuously into the mixing chamber 116. Different portions of the exhaust gas may be flowing in the first, second and third directions at the same time. The reductant injected by the injector 210 may mix with the exhaust gas flow within the mixing chamber 116.

As is clearly visible in FIG. 3, the exhaust gas flowing in the second direction is proximate to the inner surfaces of the mixing chamber 116 and spirals in a downward direction within the mixing chamber 116. The third direction may lie substantially proximate to a central portion of the mixing chamber 116 or along the longitudinal axis X-X of the mixing chamber 116. The third direction of the exhaust gas flow does not come in contact with the inner surfaces of the mixing chamber 116. Moreover, the exhaust gas flow in the third direction may be enveloped by the exhaust gas flow in the second direction.

One of ordinary skill in the art will appreciate that the reductant may be introduced into the mixing chamber 116 at several angles with respect to the longitudinal axis X-X defined by the mixing chamber 116. Some portion of the reductant may be sprayed along the longitudinal axis X-X of the mixing chamber 116. The tapering cross section 212 of the mixing chamber 116 and the 180° turn introduced in the exhaust gas flow may cause the reductant injected into the exhaust gas flow in the third direction to be carried out of the mixing chamber 116 through the second exhaust conduit 206, by contacting a relatively less area or close to none of the inner surface. Some amount of the reductant may be sprayed into the mixing chamber 116 in the direction substantially along that of the inner surfaces of the mixing chamber 116. Turbulence created within the mixing chamber 116 due to the downward spiraling exhaust gas flow in the second direction may prevent the reductant from contacting the inner surfaces of the mixing chamber 116. This may allow for relatively lesser deposition of the reductant on the inner surfaces of the mixing chamber 116. It should be noted that a timing and/or quantity of injection of the reductant may vary as per system requirements and may not limit the scope of the disclosure.

INDUSTRIAL APPLICABILITY

In mixers used for mixing of the exhaust gas and the reductant, the reductant may contact the inner surfaces of the mixer during the injection of the reductant and/or during the mixing process. After continuous operation of the mixer, the reductant may form deposits on the inner surfaces of the mixer. The deposits may grow and block an inlet, an outlet and/or other passages of the mixer. The blockages may lead to frequent service intervals or in some cases may render the mixer non-operational.

In some exhaust systems, the blockages may be prevented by a regeneration process in which the mixer is heated to burn away the deposits. The regeneration process requires an additional heating arrangement to be provided on the mixer. Further, the regeneration process may require a stipulated amount of time for completion and additional power consumption leading to reduction in overall system efficiency. Further, the formation of deposits leads to material wastage resulting in increased operational cost.

Figure 4:
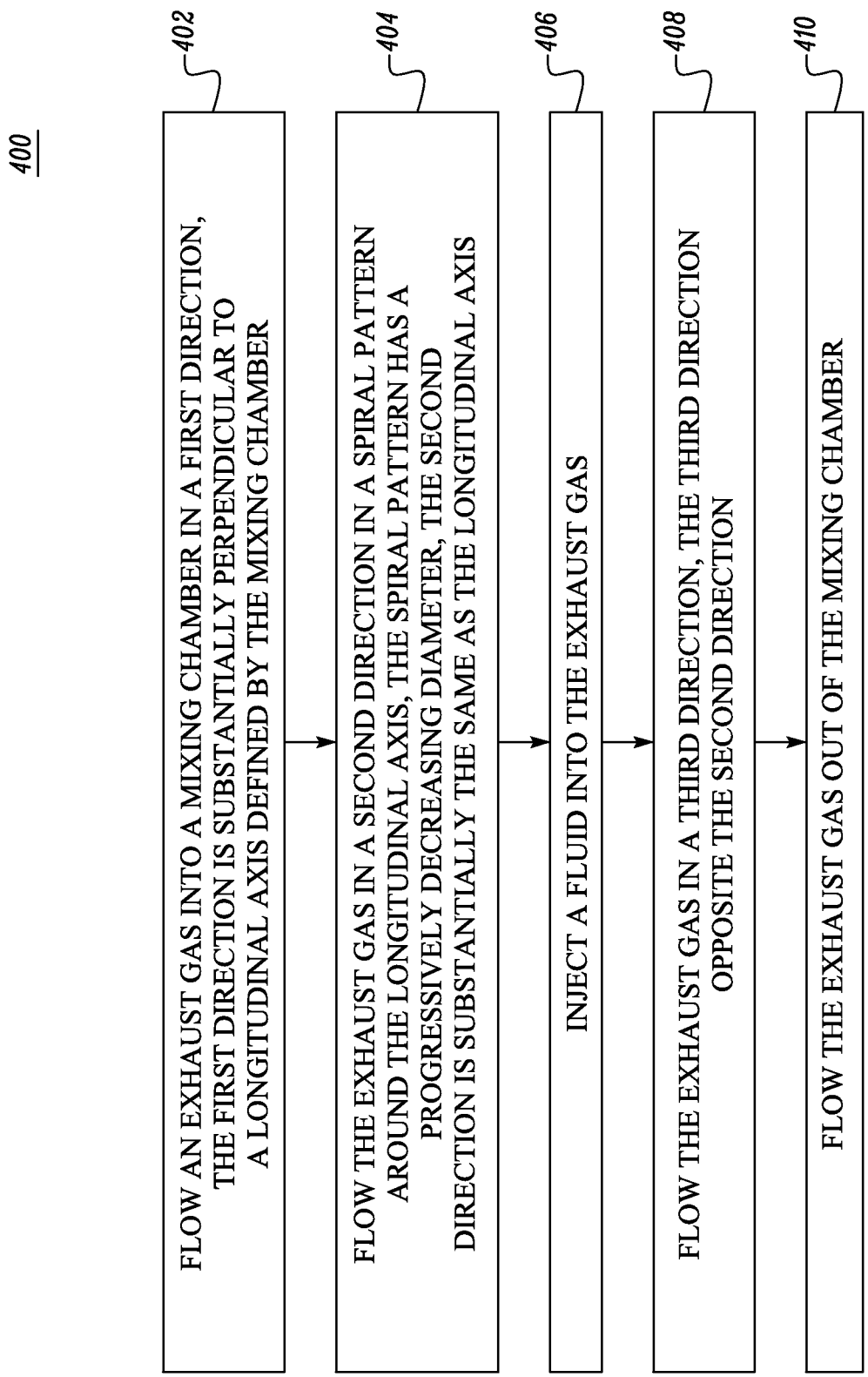
FIG. 4 is a flowchart of an exemplary method for mixing a fluid with exhaust gas of the engine system.

FIG. 4 illustrates a flowchart of an exemplary method 400 for mixing a fluid with exhaust gas. At step 402, the exhaust gas flow is received into the mixing chamber 116 in the first direction through the first exhaust conduit 204. The first direction may correspond to the first exhaust gas flow path defined by the first exhaust conduit 204 such that the first direction is substantially perpendicular to the longitudinal axis X-X of the mixing chamber 116.

At step 404, the exhaust gas flows in the second direction in the spiral pattern 305 around the longitudinal axis X-X and towards the second end 208 of the mixing chamber 116. The spiral pattern 305 has the progressively decreasing diameter such that the diameter decreases towards the second end 208. The second direction is substantially the same as that of the longitudinal axis X-X. At step 406, the fluid is injected by the injector 210 into the mixing chamber 116. In one embodiment the fluid includes the reductant.

At step 408, the exhaust gas flows in the third direction. The third direction is at least partially opposite the second direction. Due to the conical configuration of the mixing chamber 116, the exhaust gas flow takes a close to 180° turn at the second end 208 to change the path from the second direction to the third direction. While flowing in the third direction, the exhaust gas flows towards the second exhaust conduit 206.

At step 410, the exhaust gas flows out of the mixing chamber 116 through the second exhaust conduit 206. As the exhaust gas flows from the first direction to the second direction in the spiral pattern 305, and further in the third direction, the exhaust gas flow allows for efficient mixing of the reductant injected in the exhaust gas flow without being deposited on the inner surfaces of the mixing chamber 116.

The spiral pattern 305 of the exhaust gas flow is substantially proximate to the inner surface of the mixing chamber 116. The exhaust gas flow in the third direction is substantially down the center of the mixing chamber 116 along the longitudinal axis X-X. The spiral pattern 305 creates the envelope of the exhaust gas flow and prevents the reductant mixed exhaust gas flowing in the third direction from contacting the inner surfaces of the mixing chamber 116. Accordingly, the deposit formation of the reductant on the inner surfaces of the mixing chamber 116 is prevented due to reduced contact of the reductant with the inner surfaces of the mixing chamber 116.

Due to reduced reductant deposit formation on the inner surfaces of the mixing chamber 116, the frequency of service intervals and in turn equipment downtime may be reduced. Further, need of the additional heating arrangement for the regeneration process to burn away the deposition of urea from the inner surfaces of the mixing chamber 116 may also be eliminated.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A mixing chamber for an exhaust system, the mixing chamber comprising:
   a tapering cross sectional area perpendicular to a longitudinal axis of the mixing chamber;
   a first end having a first cross sectional area;
   a second end having a second cross sectional area, the second cross sectional area less than the first cross sectional area, the second end configured to receive an injector;
   a first exhaust conduit fluidly connected to the first end of the mixing chamber and defining a first exhaust gas flow path into the mixing chamber substantially perpendicular to the longitudinal axis; and
   a second exhaust conduit fluidly connected to the first end of the mixing chamber and defining a second exhaust gas flow path out of the mixing chamber substantially in the direction of the longitudinal axis.

2. The mixing chamber of claim 1, wherein the first cross sectional area is substantially circular in shape.

3. The mixing chamber of claim 2, wherein the first exhaust conduit is disposed substantially tangential with respect to the first end of the mixing chamber.

4. The mixing chamber of claim 1, wherein the first exhaust conduit has a substantially rectangular cross section.

5. The mixing chamber of claim 1, wherein the injector is positioned substantially in the direction of the longitudinal axis, the injector being configured to inject a fluid into the second end of the mixing chamber.

6. The mixing chamber of claim 5, wherein the second exhaust conduit is positioned directly above the injector.

7. The mixing chamber of claim 1, wherein the first exhaust conduit is fluidly connected to an exhaust manifold.

8. The mixing chamber of claim 1, wherein the second exhaust conduit is fluidly connected to a Selective Catalytic Reduction (SCR) catalyst.

9. A method for mixing a fluid with exhaust gas, the method comprising:
   flowing the exhaust gas into a mixing chamber in a first direction, the first direction substantially perpendicular to a longitudinal axis defined by the mixing chamber;
   flowing the exhaust gas in a second direction in a spiral pattern around the longitudinal axis, the spiral pattern having a progressively decreasing diameter, the second direction substantially the same as the longitudinal axis;
   injecting the fluid into the exhaust gas;
   flowing the exhaust gas in a third direction, the third direction opposite the second direction; and
   flowing the exhaust gas out of the mixing chamber.

10. An exhaust system for an engine, the exhaust system comprising:
    a mixing chamber defining a longitudinal axis, the mixing chamber comprising:
       a tapering cross sectional area perpendicular to the longitudinal axis;
       a first end having a first cross sectional area;
       a second end having a second cross sectional area, the second cross sectional area less than the first cross sectional area;
       a first exhaust conduit fluidly connecting an exhaust manifold of the engine to the first end of the mixing chamber and defining a first exhaust gas flow path into the mixing chamber substantially perpendicular to the longitudinal axis; and
       a second exhaust conduit fluidly connecting the first end of the mixing chamber to a Selective Catalytic Reduction (SCR) catalyst and defining a second exhaust gas flow path out of the mixing chamber substantially in the direction of the longitudinal axis; and
    an injector configured to inject urea into the second end of the mixing chamber.

11. The exhaust system of claim 10 further comprising a urea tank fluidly connected to the injector.

12. The exhaust system of claim 10, wherein the first cross sectional area of the mixing chamber is substantially circular in shape.

13. The exhaust system of claim 12, wherein the first exhaust conduit is disposed substantially tangential with respect to the first end of the mixing chamber.

14. The exhaust system of claim 10, wherein the first exhaust conduit has a substantially rectangular cross section.

15. The exhaust system of claim 10, wherein the injector is positioned substantially in the direction of the longitudinal axis.

16. The exhaust system of claim 15, wherein the second exhaust conduit is positioned directly above the injector.

* * * * *